William B. McKnight
James R. Dearman
Ralph W. Hawkins,
INVENTORS.

BY Harry M. Saragovitz
Edward J. Kelly
Herbert Berl
Robert C. Sims
ATTORNEYS

Dec. 2, 1969  W. B. McKNIGHT ET AL  3,481,340
RAPID FIRING LASER SURGICAL DEVICE

Filed June 17, 1965  3 Sheets-Sheet 3

William B. McKnight
James R. Dearman
Ralph W. Hawkins,
INVENTORS.

BY Harry M. Saragovitz
Edward J. Kelly
Herbert Berl
Robert C. Sims
ATTORNEYS

United States Patent Office 3,481,340
Patented Dec. 2, 1969

3,481,340
RAPID FIRING LASER SURGICAL DEVICE
William B. McKnight, Rte. 3, Somerville, Ala. 35670;
James R. Dearman, 411 Harolds Drive; and Ralph W.
Hawkins, 312 Harolds Drive, both of Huntsville, Ala.
35806
Filed June 17, 1965, Ser. No. 464,881
Int. Cl. A61n 5/06, 5/01; H01s 3/00
U.S. Cl. 128—395                    3 Claims

ABSTRACT OF THE DISCLOSURE

The laser surgical device consists of a unit equipped with multiple laser modules, each consisting of a laser rod, excitation lamps, and a pumping cavity with mirrors, film reflectors or corner cubes arranged in a manner such that the output may be taken from each, in turn, and directed to a specific area.

---

The invention described herein may be manufactured and used by or for the Government for governmental purposes without the payment of any royalty thereon.

There has long been present a problem of how to position the beam of laser device so that both small and large movements may be made by the operator. This problem becomes even more difficult when more than one laser source is to be used. A laser device, because of its size and its protective covering, does not lend itself mobility. This is especially true with respect to small movements for accurate placement of the beam. The firing of the pump lamps of laser devices has presented a time delay problem as the source for most high energy laser devices is a storage type source such as a capacitor bank or an induction coil. These sources require a time delay between the firing of the pump lamps as they must restore the energy.

It is, therefore, an object of the invention to provide a laser device which is capable of rapid firing.

A further object of the present invention is to provide an electromagnetic radiation device in which a radiation beam may readily be positioned.

A still further object of this invention is to produce a laser device which can be used as a surgical device.

By the use of multiple laser modules and multiple storage sources and charging units, applicants have produced a rapid firing laser device. The laser beam is diretced inside an output section which is a hollow arm having flexible elbows so that the end of the section may be positioned by the operator. This is accomplished by mechanical means such that the mirrors, which are placed in the bends of the elbows, will have an angle which changes at ½ the rate of the change in the angle of the bend. This output section is articulated in a manner such that the laser beam from any module impinges on a point at the end of the device in accordance to the direction of an operator. This invention finds particular use as a surgical device. The laser is directed by the surgeon to a specific area of tissue to be treated, such as cancer cells. The tissue is exposed either by being on the body surface or through other surgical techniques.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

In order to better understand the operation of the system described in the figures, a description of their components referred to is first presented.

Figure 1:
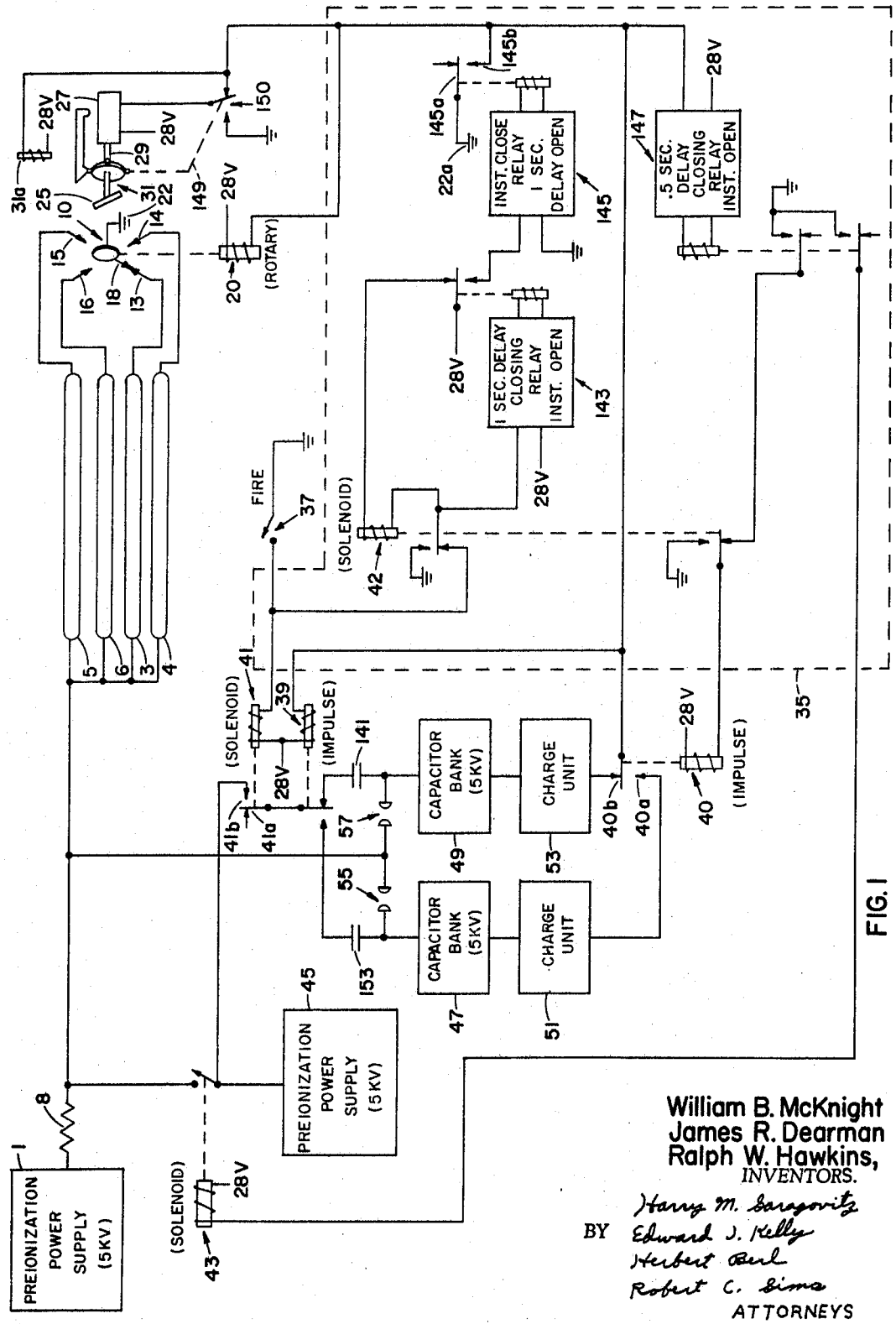
FIGURE 1 illustrates a fire control system in block diagram according to the invention.

In FIGURE 1, preionization power supply 1 is a 5 kv. source of DC voltages which is connected at one end of each of the flash lamps 3 through 6 by way of current limiting resistor 8. The flash lamp to be fired, lamp 3 in the showing of FIGURE 1, is selected by a rotating switch mechanism 10. Switch mechanism 10 has a plurality of contact terminals 13 through 16 which are connected respectively to the other ends of the flash lamps 3 through 6. A contact arm 18 is mounted for rotation by a rotary relay 20 so as to make individual contact with terminals 13 through 16. The return path for preionization power supply 1 is through the ground connection 22.

A mirror 25 is provided for reflecting the laser beams. A motor 27 positions mirror 25 for the optical path from each laser rod by way of a shaft 29. A latch and stop mechanism 31 is provided to cause the motor 27 to stop at the correct positions. A programmer 35 is provided to initiate the action and the timing of the motor, rotary relay, and other circuit elements of the system. A fire switch 37 is provided to initiate programmer 35. Relays 39 and 40 are impulse relays which will cause their switch arms to change connection each time the relays are energized. Relays 41 through 42 are solenoid relays which are biased in the positions shown in FIGURE 1.

A preionization start power supply 45 is a high voltage source (5 kv., DC) which is used to initially ionize a selected flash lamp. Said source can be any well-known high voltage, high impedance, and low power source. For providing high power to the selected flash lamp, capacitor banks 47 and 49 are provided. Charge units 51 and 53 are provided to charge these capacitor banks. Spark gaps 55 and 57 are provided to connect (and isolate) the capacitor banks to the flash lamps.

Figure 2:
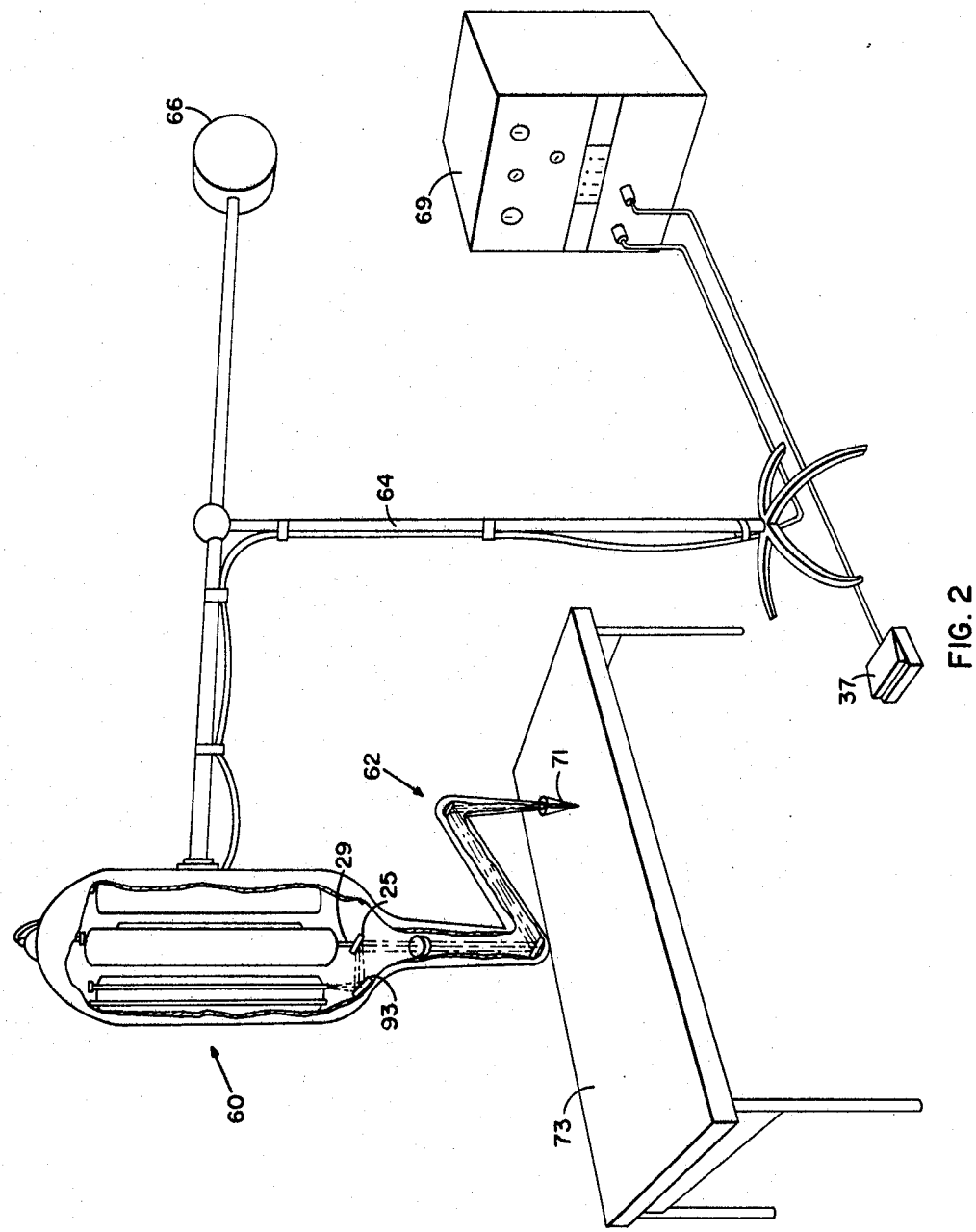
FIGURE 2 is a perspective view of the over-all structure.

In FIGURE 2, the laser modules 60 and the output section 62 are shown to be supported by a stand 64 in such a manner that it may be positioned above a patient for ease of direction and to allow personal access to the operating table 73. A counter weight 66 is provided for balance. The unit 69 contains the programmer, the sources, and the firing circuitry. The fire switch may be located on the unit 69 or it may be located in the area of the output section so as to be easily accessible to a operator. The fire switch may be a foot pedal located as shown or a push button, located on the nozzle 71 of output section 62. An operating table 73 is provided for the subject.

Figure 3:
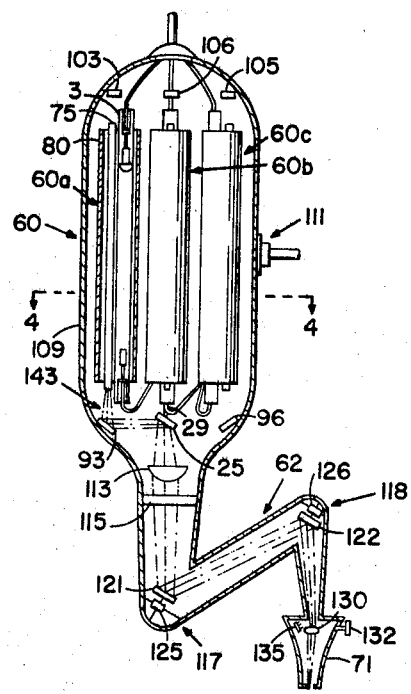
FIGURE 3 is a cutaway view of the modules and output section of the present invention.
Figure 4:
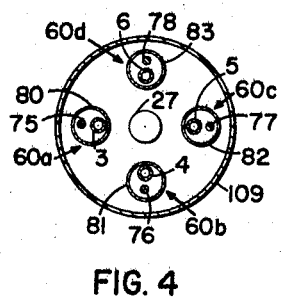
FIGURE 4 is a cutaway view of FIGURE 3 looking in at 4—4.

In FIGURES 3 and 4 the laser modules 60a, 60b, 60c, and 60d are shown. These modules are supported within the container by any of the well-known means. Each module contains one of the laser rods 75–78, flash lamps 3–6, and envelopes 80–83. The envelopes each have a reflective intercoating to distribute the light energy emitted from the lamps. Mirrors 93–96 are mounted so as to reflect a laser beam from a corresponding laser rod to mirror 25. Mirrors 94 and 95, not shown, would be positioned as mirrors 93 and 96 but in line with laser rods 76 and 78. Mirrors 103 through 106 are provided to reflect any laser beam energy back to the rod that may escape from the back of laser rods 75 and 78. A reflected coating on the back end of the laser rods may be used to supplement and/or replace mirrors 103 through 106. A case 109 is constructed of heavy, strong material such as steel so that an explosion of one or more of the flash lamps will be contained in a safe manner. Cool air or water may be circulated within the case by an air input tube 111. The case provides support for all the elements therein and is, in turn, supported by stand 64 (see FIGURE 2). Motor 27 is shown in FIGURE 4, and its shaft 29 is shown in FIGURE 3. The motor and shaft are provided to position mirror 25 so as to reflect a laser beam through objective lens 113 into the output section 62.

Output section 62 is connected to case 109 at 115 in such a manner that it can rotate 360° relative to the case. The output section is made of fiberglass, or the like, and has two flexible elbows 117 and 118 and a nozzle 71. Mirrors 121 and 122 are mounted in these elbows such that they bisect the angle made by the elbow. This is accomplished by half angle motion devices 125 and 126. A focusing lens 130 is provided with a lens focusing screw 132 so that the laser beam may be focused to a point at the selected area. An energy level selector switch 135, which is connected to control the amount of charge on the capacitor banks, is shown in FIGURE 3 as being located on the nozzle. This selector may also be located on the unit 69, shown in FIGURE 2.

OPERATION

To start operation, fire switch 37 is closed. Switch 37 is biased to the open condition, and the operator should release it right after closure. The closure of switch 37 will provide a complete path for relays 41 and 42, therefore, causing switch arm 41a to close on contact 41b. This provides a path for the high voltage source 45 through the capacitor 141, spark gap 57, flash lamp 3, and switch 10 to ground 22. The insertion of the voltage 45 across spark gap 57 causes it to break down, therefore, completing a path from capacitor bank 49 to the flash lamp 3. Capacitor bank 49 supplies sufficient power to flash lamp 3 to cause laser rod 75 to fire. A laser beam 143 from the rod 75 is reflected by mirror 93 (FIGURES 2 and 3) to mirror 25 which, in turn, reflects it through lens 113 to mirror 121. Mirror 121 is always positioned by mechanism 125 such that the beam is reflected to mirror 122. Mirror 122 is positioned by mechanism 126 such that the laser beam is reflected through focusing lens 130 and through nozzle 71 to a point. This point has been positioned by the operator on the area desired to be treated. The preionized flash lamp will emit sufficient light, before its firing, through the output section and the lenses so the operator will have a point of light to guide him by virtue of the lenses. A separate light source could also be provided within the case 109 so as to always show a point of light at the end of nozzle 71.

While the firing is done, the circuit will recycle for the next firing. As set forth above, the closing of fire switch 37 will complete the path of the solenoid of relay 42 thereby starting operation of a 1 second closing relay 143 and impulse relay 40. Relay 40 now contacts contact 40a, but there is no path yet for charge unit 51 connecting circuit as the contacts of relay 145 are not set on ground 22a. Relay 143, after 1 second delay (which is sufficient time for the completion of the firing of laser rod 75 and for the operator to release fire switch 37), closes. This causes operation of an instant close, 1 second delay open relay 145, and also opens the power to itself. Relay 145 closes switch arm 145a onto contact 145b, therefore, causing rotary relay 20, latch mechanism 31, motor 27, relay 147, impulse relay 39, and connecting circuit of charge unit 51 to operate.

Charge unit 51 will now be connected to charge capacitor bank 47. The connecting circuit in charge unit 51 will automatically cut off when capacitor bank is charged to a predetermined value. Rotary relay 20 will cause switching mechanism 10 to rotate so that arm 18 is connecting contact 14 (this happens in less than a ½ second). Latch mechanism 31, being lifted by solenoid 31a, allows energized motor 27 to rotate shaft 29 and thereby position mirror 25 so that it will now reflect a laser beam reflected by mirror 94, not shown, from laser rod 76 which is the next rod to be excited. It takes motor 27 longer than one second to move mirror 25 to the next position; therefore, a micro switch 149 is provided to complete a ground connection at 150 for the motor circuit until it is latched in at the next position.

After a ½ second delay, relay 147 closes, therefore, causing relay 43 to complete a circuit of the preionization start power supply 45 to the flash lamps. The reason for the delay is to allow switch mechanism 10 to complete the selection of the next flash lamp to be fired. Power supply 45 will break down flash lamp 4 and set it into a preionize state. Power supply 1 will keep flash lamp in this state by virtue of its connection thereto. Relay 147 also causes relay 40 to be energized again, therefore, connecting the connecting circuit in charge unit 53 to the ground 22a. This will cause charge unit 53 to charge capacitor bank 49 to a predetermined value. Charge unit will automatically cut off at this time.

Impulse relay 39 will switch to the contact connected to capacitor 153 so that the next spark gap to be broken down through a capacitor will be spark gap 55. This means that the capacitor bank 47 will supply power to flash lamp 4 upon the next closure of fire switch 37.

Once capacitor bank 47 is up to charge, the circuit is ready to be fired and recycled. It may be noted that both charge units are signaled to charge their respective capacitor bank during each cycle. This is done to make sure that a bank hasn't been discharged in error.

We claim:

1. A system for directing a laser beam to points in three-dimensional space comprising a plurality of laser modules; each module emitting a laser beam when fired; supporting means; said laser modules being connected to said supporting means such that they are aligned in a circle array and will emit parallel laser beams; selective means connected to said supporting means so as to receive any laser beam emitted by the laser modules; a hollow arm having an input end and an output end and at least two flexible elbows therein so that the arm can be bent and positioned in different locations; said arm having its input end connected to said supporting means so as to be relative rotatably therewith; said selective means directing the received laser beam of a selected module into the input end of said arm; reflecting means connected inside said arm at the elbows so as to bisect the angle at said elbows and reflect the laser beam through said arm to the output end of said arm; and an adjustable lens device connected at the output end of said arm so as to focus the laser beam to a point.

2. A system as set forth in claim 1, wherein said selective means comprises a plurality of mirrors equal in number to the number of laser modules; said mirrors being connected to the supporting means in a circle array so as to receive and reflect the laser beams from different laser modules; a rotating mirror means connected to said supporting means; each of said mirrors reflecting the laser beams to said rotating mirror means; driving means connected to said rotating mirror means so as to be able to position the rotating mirror means to selectively receive and reflect to the input end of the arm any one of the laser beams reflected by said mirrors; and a lens means connected to the supporting means between said rotating mirror means and the input end of said hollow arm so as to receive the laser beams reflected by said rotating mirror means and to focus the beam into parallel rays which are directed through said arm to said adjustable lens device.

3. A device, manipulated by an operator, for directing a laser beam to points in three-dimensional array over an area comprising a stand in normal relation to the area; a case secured at a point in said stand for rotation in normal and parallel relation with the area and disposed for access of the operator around the area; an output section having a nozzle secured to said case for relative rotation; a shaft disposed in said case in axial relation with said output section; a plurality of laser modules disposed in radial relation with said shaft for successive excitation of said modules for parallel beam emission; a plurality of mirrors and an objective lens disposed to conduct beams from said modules through said nozzle; and said output section being provided with a pair of elbows disposed for flexible operation of said nozzle with respect to said modules to direct the laser beams to the points of the three dimensional array.

References Cited

UNITED STATES PATENTS

| | | | |
|---|---|---|---|
| 1,554,304 | 9/1925 | Steinberg | 128—395 |
| 2,589,363 | 3/1952 | Foufounis | 350—48 XR |
| 3,012,463 | 12/1961 | Krivit | 350—48 XR |
| 3,096,767 | 7/1963 | Gresser et al. | 128—395 |
| 3,310,753 | 3/1967 | Burkhalter | 331—94.5 |
| 3,315,680 | 4/1967 | Silbertrust et al. | 128—395 |
| 3,348,547 | 10/1967 | Kavanagh | 128—395 |
| 3,378,446 | 4/1968 | Whittlesey | 331—94.5 XR |
| 3,382,343 | 5/1968 | Muncheryan | 331—94.5 XR |

FOREIGN PATENTS

| | | |
|---|---|---|
| 779,969 | 1/1935 | France. |
| 966,455 | 8/1964 | Great Britain. |

RICHARD A. GAUDET, Primary Examiner

K. L. HOWELL, Assistant Examiner

U.S. Cl. X.R.

331—94.5; 350—50, 299